July 2, 1946.    W. H. EDDY    2,403,269
PROJECTOR FOR PAGE PRINTERS
Filed July 17, 1940    6 Sheets-Sheet 1

INVENTOR
WILLIAM H. EDDY
BY
ATTORNEY

July 2, 1946. W. H. EDDY 2,403,269
PROJECTOR FOR PAGE PRINTERS
Filed July 17, 1940 6 Sheets-Sheet 2
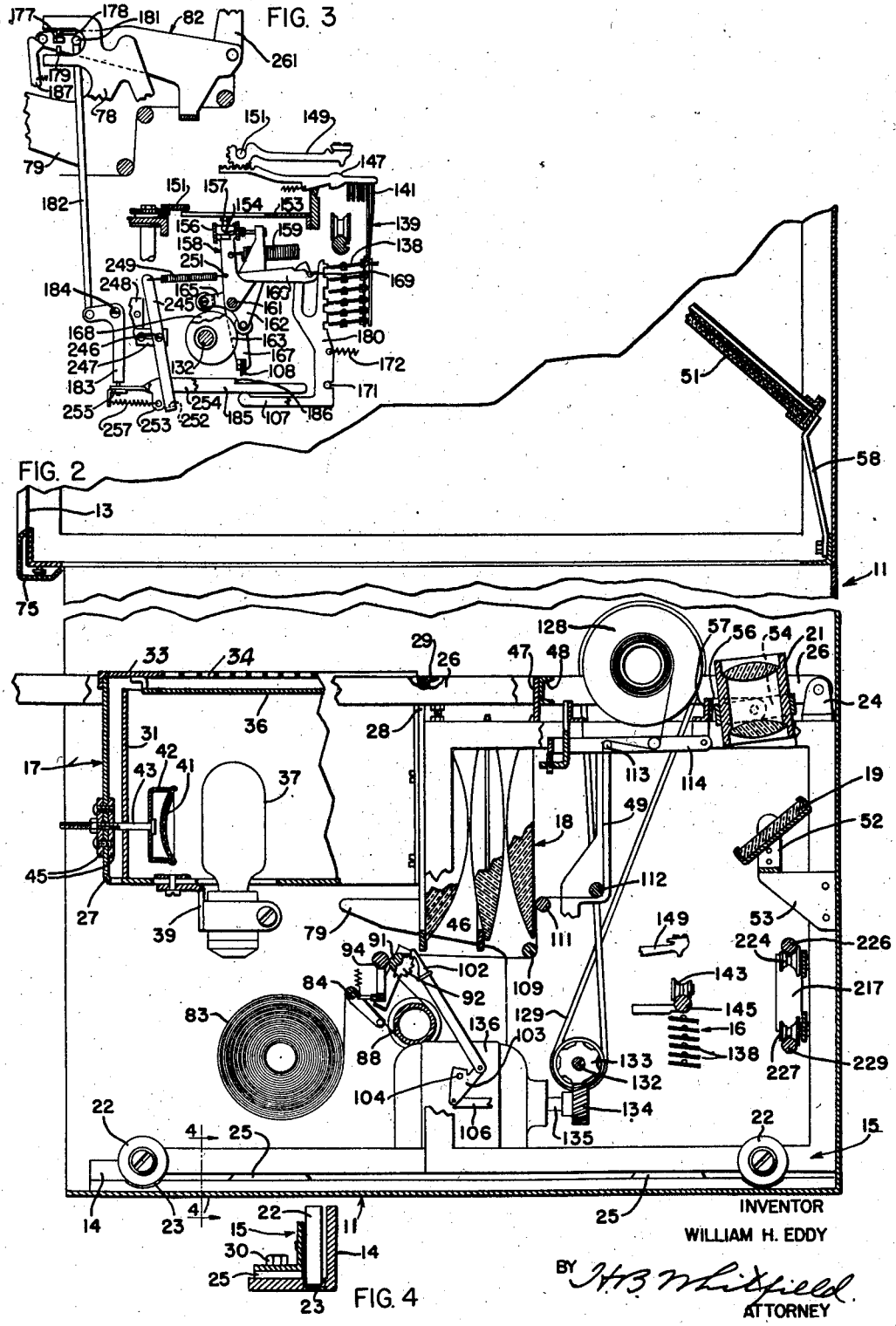
INVENTOR
WILLIAM H. EDDY
BY
ATTORNEY

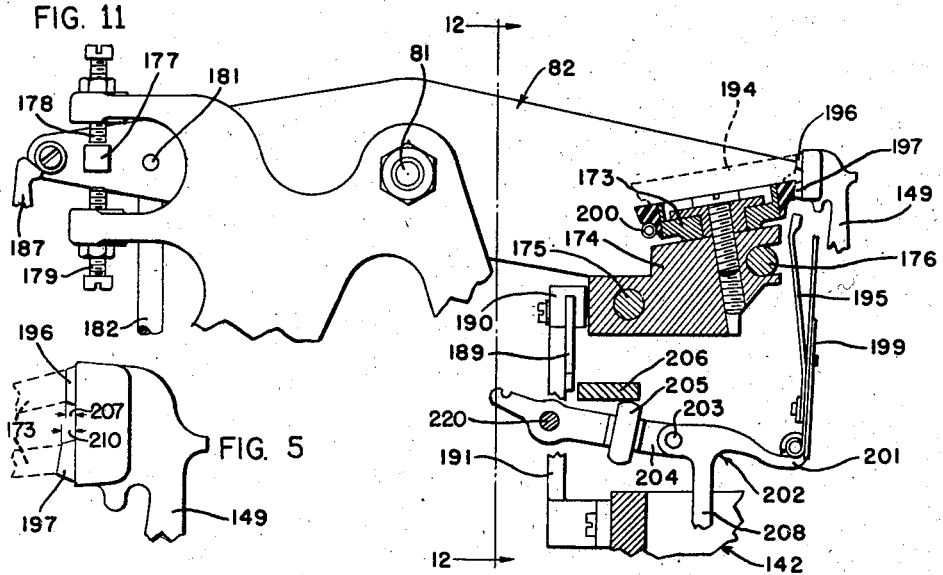
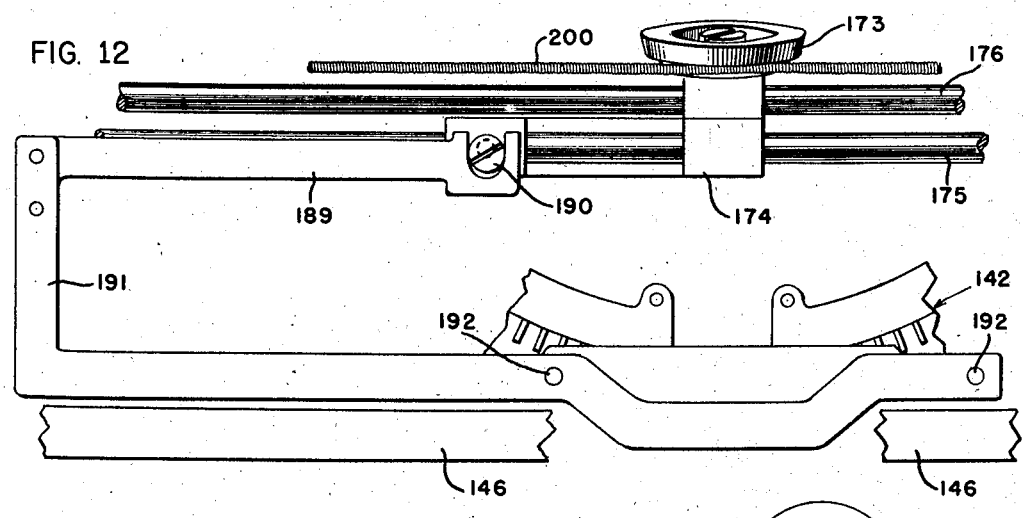
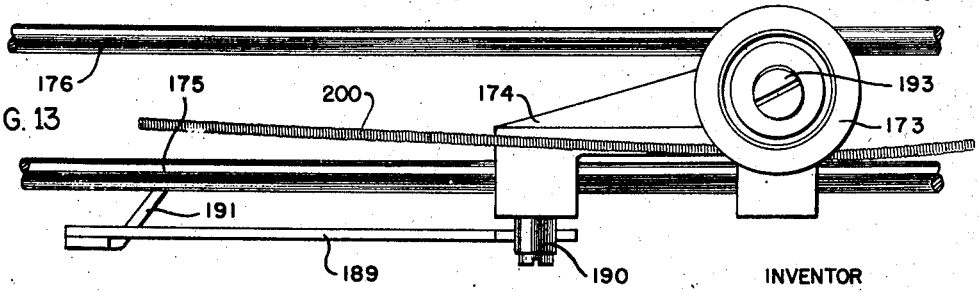

July 2, 1946.    W. H. EDDY    2,403,269
PROJECTOR FOR PAGE PRINTERS
Filed July 17, 1940    6 Sheets-Sheet 4

INVENTOR
WILLIAM H. EDDY
BY H.B. Whitfield
ATTORNEY

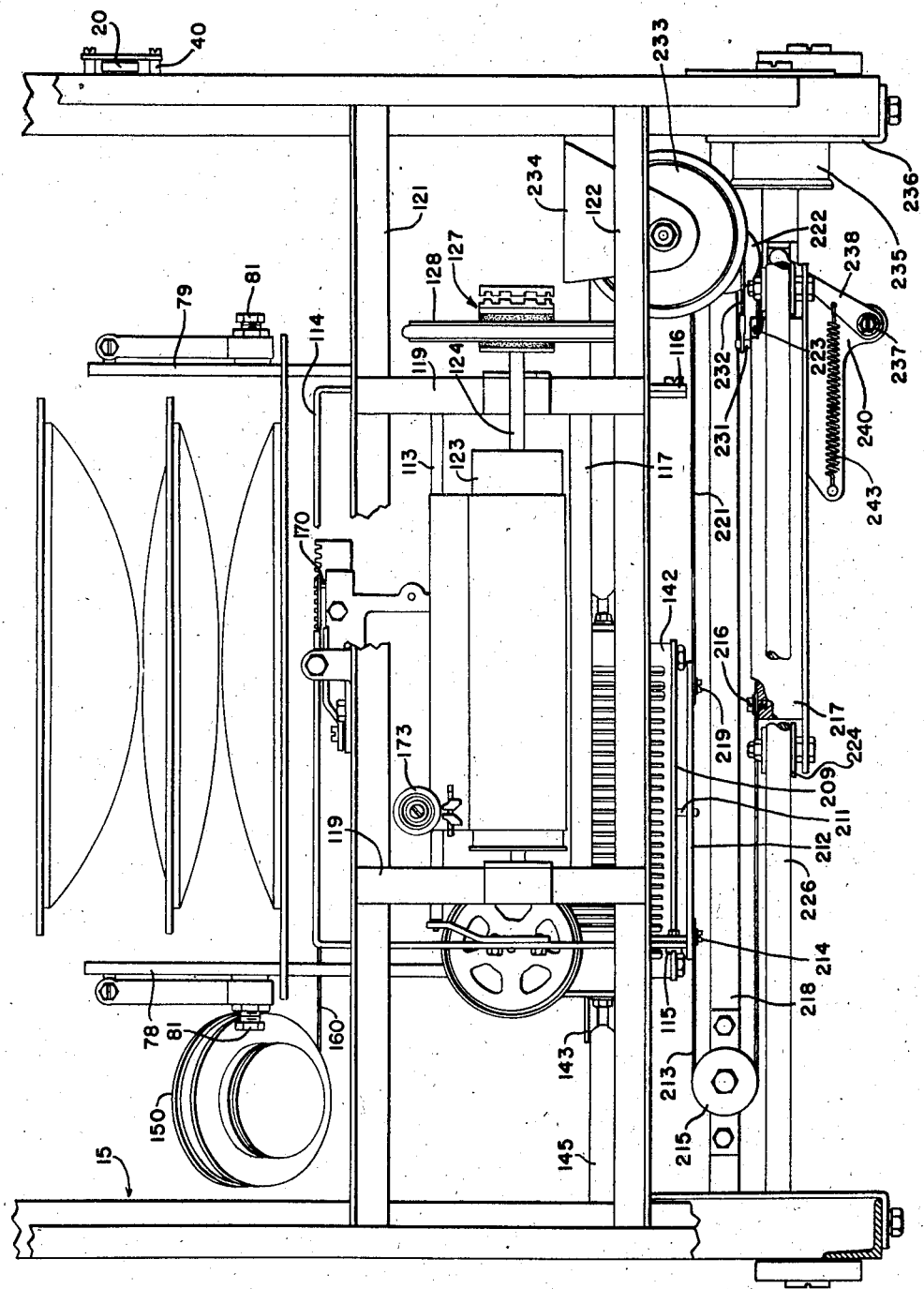

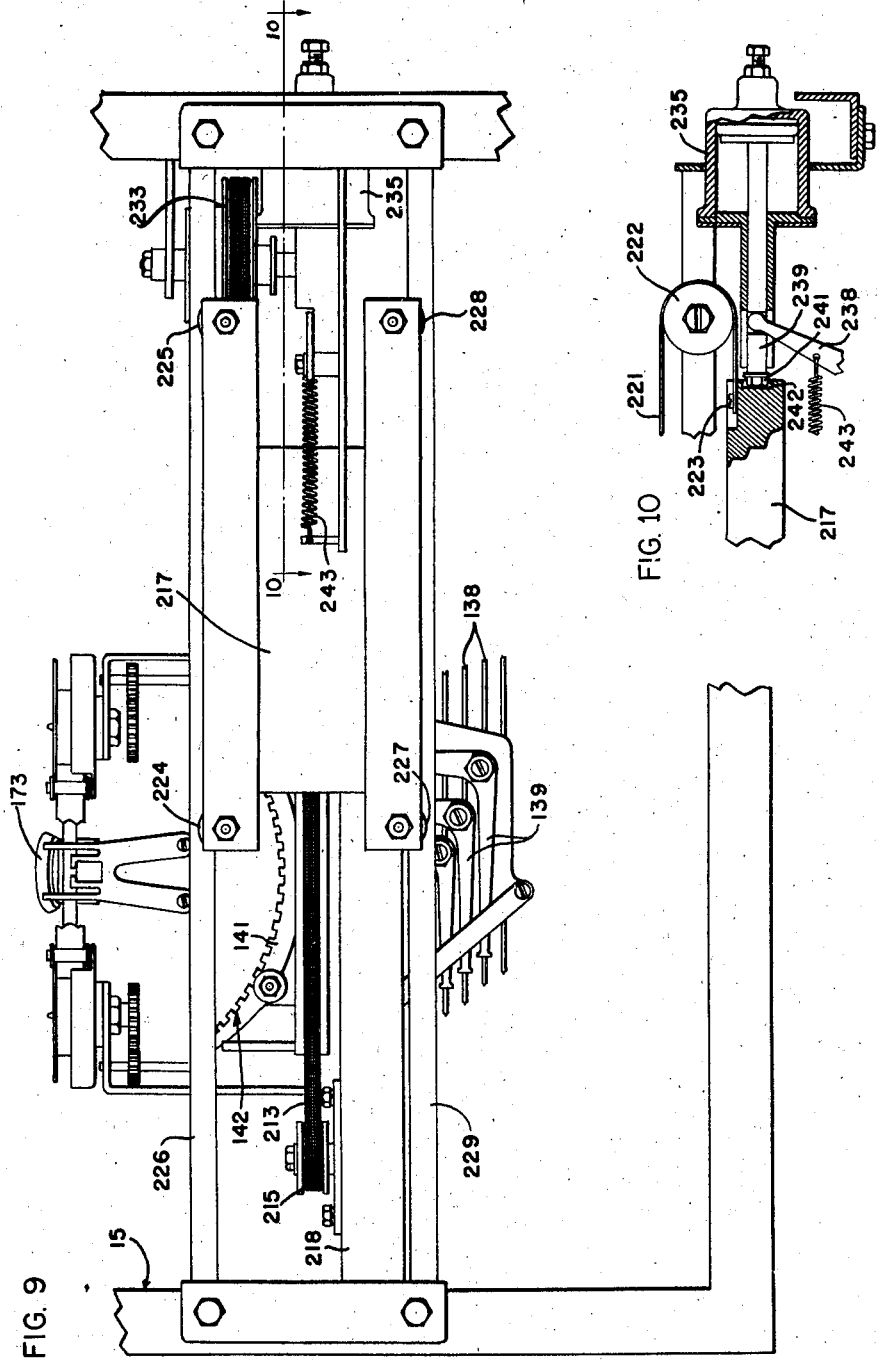

Patented July 2, 1946

2,403,269

UNITED STATES PATENT OFFICE 2,403,269

PROJECTOR FOR PAGE PRINTERS

William H. Eddy, Downers Grove, Ill., assignor to Teletype Corporation, Chicago, Ill., a corporation of Delaware Application July 17, 1940, Serial No. 346,002

11 Claims. (Cl. 197—82)

The present invention pertains to printing telegraph projection systems and apparatus and more particularly to combination page printers and projectors for displaying on a screen or inspection area information in enlarged characters.

The primary object of the invention is to provide a page printer-projector which is capable of operating reliably and efficiently in any angular position.

Another object of the invention is to provide a mechanism for automatically controlling the weight of printing upon the record material so as to produce upon the screen images of uniform distinctness.

According to the present invention a projection system has been provided which embodies a page printer, of the type shown in U. S. Patent No. 1,904,164, designed to give upon a screen a running account of received message matter, through the instrumentality of an optical system comprising an arrangement of inclined mirrors so that the printer and lamp housing may be located at the lower part of a suitable cabinet, and the screen formed as a part of the upper forward wall of the cabinet and positioned above the printer compartment.

Specifically, the page printer is mounted on rails supported in a structural frame to which is pivotally mounted the lamp housing, in such manner that the lamp housing with its condensing lenses is positionable so as to embrace within the field of projection the last line of printing, and also to include eight or ten printed lines. Printing is effected on a Cellophane strip and the image of the record produced thereon is projected through the optical system onto the screen. The Cellophane web or strip is drawn upwardly through the projection field. The characters on the section of the web in the projection field are so arranged as to form horizontal lines one above the other, and the images of said horizontal lines of characters are projected on the screen. The horizontal lines of images on the screen move upwardly across the screen similar to the movement of the web through the projection field.

The lamp housing together with the condensing lenses is swingable upwardly about its pivotal articulation with the structural frame to permit ready access to the page printer, which is slidable on rails so that when the lamp housing is raised, the printer may be slid outwardly to permit withdrawal and thus render it accessible for servicing.

The foregoing and other objects and features of the invention will appear from the following detailed description taken in conjunction with the accompanying drawings, in which, Fig. 1 is a perspective view of the projection cabinet with a part of the wall broken away to show schematically the optical and projection system;

Fig. 2 is a cross-sectional view of the printer-projector according to the present invention;

Fig. 3 is a cross-sectional view of the printer showing a printing impact equalizing mechanism;

Fig. 4 is a detail cross-sectional view taken on line 4—4 of Fig. 2;

Fig. 5 is an enlarged side view of a type bar head;

Fig. 8 is a plan view of the printer-projector taken on line 8—8 of Fig. 6;

Fig. 9 is an elevational view of the printer-projector;

Fig. 10 is a sectional view taken on line 10—10 of Fig. 9;

Fig. 11 is an enlarged cross-sectional view of the printer platen and platen frame;

Fig. 12 is a view taken substantially on line 12—12 of Fig. 11; and

Fig. 13 is a top view of the part of the printer mechanism shown in Figs. 11 and 12.

Figure 1:
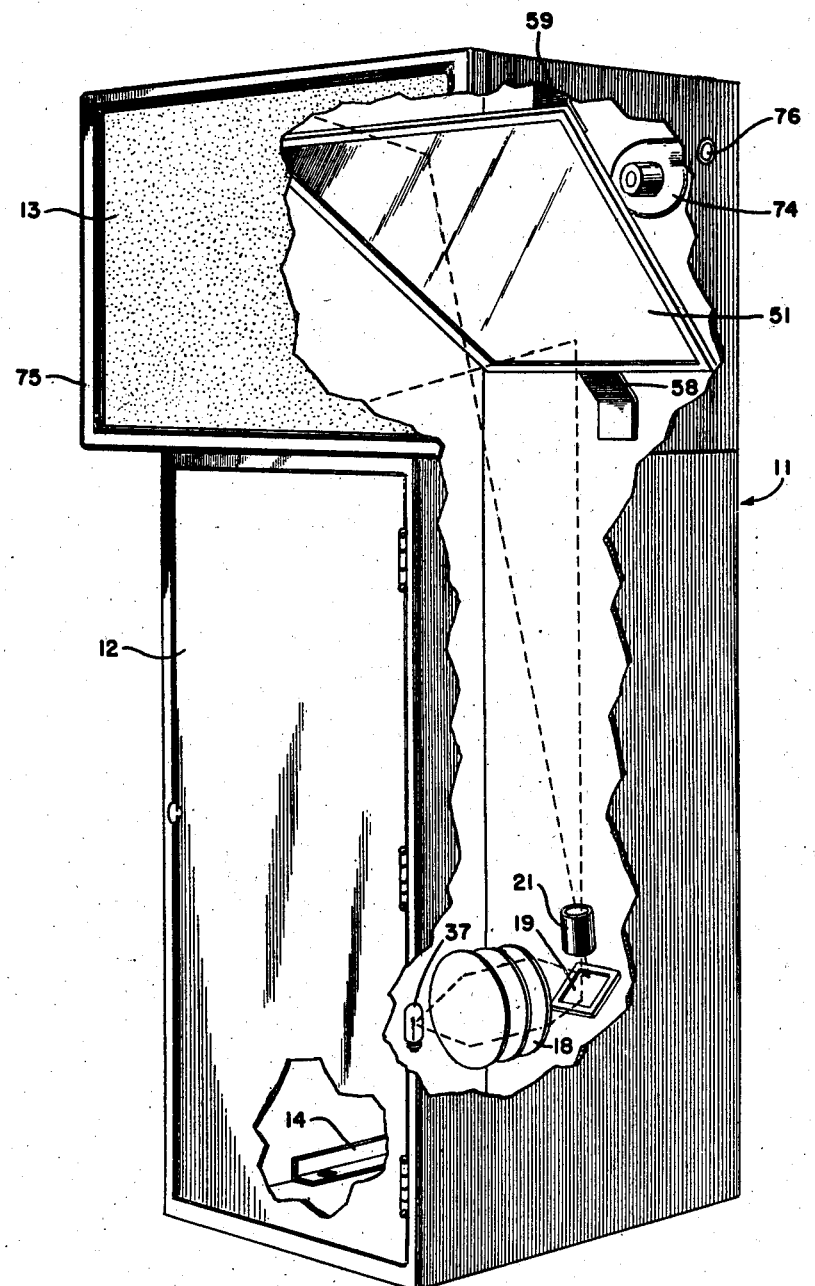

Having reference to the drawings in which like reference characters indicate similar parts throughout the several views, the combination page printing and projecting apparatus according to the present invention is housed in a cabinet, indicated generally by the numeral 11, which is provided in the lower portion thereof with a door 12, and in the upper portion with a translucent projector screen 13. Secured to the floor of cabinet 11 are two angle iron rails 14 (only one of which is shown in Fig. 1) which provide a track for the frame 15 (Fig. 2) which supports the page printing apparatus, indicated generally by the numeral 16, the lamp housing 17, and the optical arrangement represented generally by condensing lenses 18, small mirror 19 and objective lens 21. Wheels 22 are journaled to the bottom side members of the frame 15 and cooperate in rolling relation with rails 14, which are provided with indentations 23 into which the wheels 22 are admitted when the frame 15, in assuming its fully inserted position in the cabinet 11, rests upon spacing bosses 25. In the fully inserted position, the frame 15 is anchored by means of bolts 30 to the base of the cabinet 11. With this arrangement, the frame is easily insertable in the cabinet 11 by means of rollers 22, and moreover is adapted, when the proper position has been assumed, to rest upon spacers 25 and to be anchored to the cabinet by the bolts 30.

At each side of frame 15 and disposed at the rear thereof are pivot supports 24 for a frame 26 which carries the lamp housing 17 and condenser lenses 18. A bar 20 (Fig. 6) is pivoted to frame 26, and the lower end of said bar is provided with a hook portion (not shown) which, when the frame 26 is swung upwardly about pivots 24 to facilitate removal of the printer for servicing, is held in its upward position by the engagement of said hooked portion with spacer stud 40 (Fig. 8) in well-known manner, the bar 20 thus serving as a brace or support. The lamp housing 17 comprises an outer casing 27 (Fig. 2) which is secured to a plate 28 fastened to a crossbar 29 of the frame 26. Contained within the lamp housing 17 and suitably spaced from the outer casing 27 thereof is a baffle plate 31 which rests upon the bottom of the housing 17 and extends upwardly to a point close to the top, as illustrated in Fig. 2. The bottom of the housing 17 is provided, between the outer casing 27 and the baffle plate 31, with apertures 32. This construction permits the flow of convection currents between the outer casing 27 and the baffle plate 31 for cooling purposes. Housing 17 is provided with a cover 33 having a grilled section 34 covered by a meshing if desired. Depending from the cover 33 and spaced therefrom is a baffle plate 36 (Fig. 2) of substantially the same area as the opening 34. To protect the condensing lenses 18 from the heat of lamp 37, the bottom of the housing 17 may be cut away immediately adjacent thereto, to afford greater ventilation thereabout. Lamp 37 is adjustably clamped to a bracket 39, which in turn is adjustably supported by the floor of the housing 17. A reflector 41 is spring clamped by a carrier 42 which is adjustably supported, through the instrumentality of a rod 43 and the enlarged mounting holes for plates 45, by the outer casing 27 of the lamp housing 17.

In the embodiment of the invention shown in the drawings, a condensing lens system 18, comprising two plano-convex lenses and one convexo-convex lens, is provided, these lenses being suitably clamped by clamps 44 to plates 28, 46, and 47 which are appropriately separated by spacing posts (not shown). Plate 47 is secured along its top edge to a crossbar 48 (Fig. 2) of frame 26. Plates 28, 46, and 47 are suitably apertured to provide a field of projection of such area as to present upon the screen 13 (Fig. 1) a predetermined number of lines of printing produced on the record strip or web 49 of transparent material.

As previously mentioned, the optical system of the present invention includes a mirror 19 and an objective lens 21. The optical system also includes a mirror 51 (Fig. 1) supported in the upper part of the cabinet 11, and through this system the image is projected upon the screen 13. The mirror 19 is adjustably pivoted on a pair of standards 52 by means of which its angular position may be determined. Moreover, standards 52 are adjustably mounted on brackets 53 secured to frame 15. The objective lens 21 is adapted to be adjustably clamped by a clamping band 54 which is supported on a U-shaped bracket 56, which in turn is secured to a crossbar 57 on frame 15. Thus, the adjustable mountings provided for the mirror 19 and the objective lens 21 facilitate the proper positionment of the image on the screen.

Mirror 51 is supported at three points to minimize, or even eliminate the possibility of injury to the mirror due to a twisting action. Mirror 51 is secured to the cabinet 11 through the instrumentality of a bracket 58 located centrally of the bottom edge of the mirror. At each of the upper corners of mirror 51 is provided a bracket 59 by means of which the mirror is secured to the roof of cabinet 11. Mirror 51 is in the form of a regular trapezoid, with the shorter of the parallel sides positioned contiguous to bracket 58. The trapezoidal shape of the mirror 51 conforms to the effective shape of the field of projection at the angle at which mirror 51 is placed in cabinet 11. Mirror 51, so shaped, produces a rectangular visual field or field of projection on screen 13, which accordingly is of rectangular conformation.

A blower or exhaust fan 74 (Fig. 1) is located at the upper part of the cabinet 11 and is positioned behind the mirror 51. Blower 74 is so mounted that its exhaust port projects through an aperture 76 in cabinet 11, and is suitably supported in said cabinet.

Having reference to Fig. 2, a page printer of the type shown in U. S. Patent No. 1,904,164 is mounted in the frame 15. The printer, indicated generally as 16, has been modified in certain respects to adapt it for use with the projector of the present invention. The page printer comprises the side frames 78 and 79 (Fig. 6) to which is pivoted at 81 a platen frame indicated generally as 82. The usual cylindrical form of platen has been dispensed with in the present embodiment of the invention and has been substituted by the disc form of platen 173 shown in Figs. 11, 12, and 13, and which will be hereinafter described.

Figure 6:
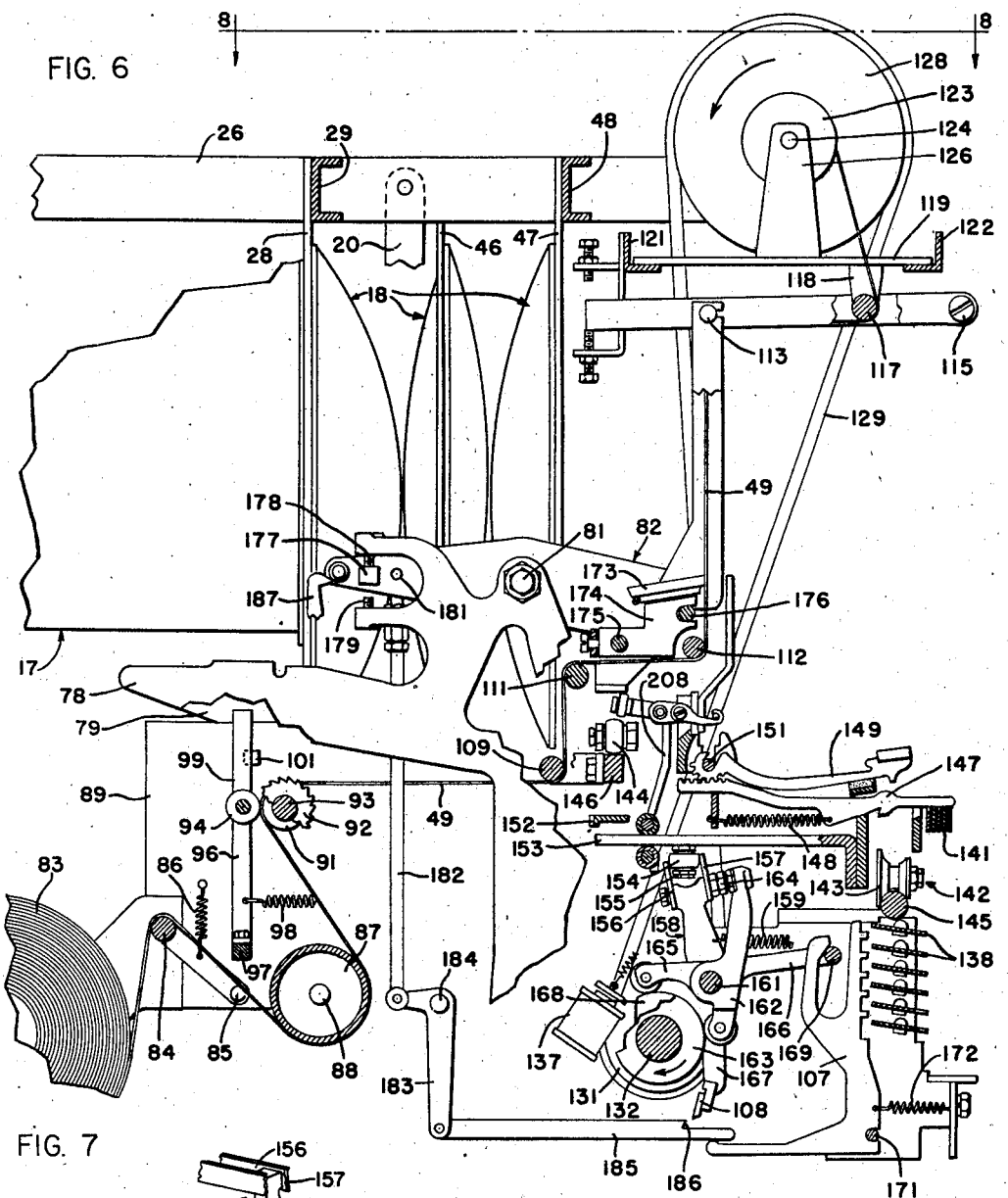
Fig. 6 is an enlarged side view and partial section of the printer mechanism and associated lamp housing and part of the optical arrangement.

To provide a running account of the message printed on the page material, a delivery mechanism is provided which comprises a means for permitting the record material to escape from the supply roll, suitable guides, and a web pulling means whereby the page material is advanced through the printing zone. The page material 49 in being withdrawn from the roll 83 is directed over a slack bar 84 which is pivoted at 85 and is normally biased clockwise by a spring 86 to maintain the page material or cellophane web taut between the roll 83 and a flanged cylindrical guide 87 carried on a shaft 88 journaled in plates 89 depending from side frames 78 and 79. The web 49 is then directed over a roller 91 to which is fixed a ratchet wheel 92, the ratchet wheel and roller being carried on a shaft 93 journaled in the plates 89 secured to side frames 78 and 79. Cooperating with the roller 91 is a pressure roller 94 which is carried on a standard 96 secured to a rock shaft 97. Pressure roller 94 is drawn into pressing relation with roller 91 by means of a spring 98. Secured to rock shaft 97 and located in juxtaposition to plate 89 is a pressure roller release lever 99. Cooperating with lever 99 is a shoulder 101 on plate 89 arranged so that when lever 99 is actuated counterclockwise (as viewed in Fig. 6) against the action of spring 98 it will latch up behind or on the left-hand side of the shoulder 101, thereby releasing the pressure roller 94 from engagement with pressure roller 91 and maintaining this condition until lever 99 is again released from the shoulder 101 to permit spring 98 to bring roller 94 again into pressing relation with roller 91. Associated with the ratchet wheel 92 is a pawl member 102 (Fig. 2) which is pivoted to a bell crank lever 103 carried on a pivot shaft 104. The depending arm of bell crank 103 is pivoted to one end of a push rod 106, the other end of which is shouldered to cooperate with a function bail 108 in the manner shown in the aforementioned Patent No. 1,904,164. Thus, in response to a predetermined selection a function lever similar to function lever 107 shown in Fig. 6 is selected to raise the free end of push bar 106 upwardly into the path of the function bail blade 108. Then, when the push rod 106 is actuated leftwardly by the function bail 108, clockwise rotation is imparted to bell crank lever 103 to impart in turn, downward movement to pawl 102. In this manner, the ratchet wheel 92 is rotated clockwise one step, which, through the cooperation of pressure rollers 91 and 94, acts in cooperation with a web pulling device to deliver a predetermined amount of record material 49 from the supply roll 83 to the printing zone and the projection area.

The record material 49 is brought to the printing position by means of a pulling or drawing mechanism now to be described. The record material 49 as it leaves roller 91 is directed around guide rods 109, 111, and 112. These guide rods may take the form of a fixed rod carrying guide rollers thereon to eliminate friction. From the guide rod 112 the record material 49 is directed vertically through the printing zone and projection area to a guide rod 113 carried by a U-shaped shifting frame member 114 (Figs. 2, 6, and 8) pivotally carried on pivots 115 and 116 (Fig. 8) suitably journaled in the frame 15. The page material 49 is then directed around a guide rod 117 carried in supports 118 (Fig. 6) depending from bars 119 secured to angle iron cross bars 121 and 122 of frame 15. From thence, the page material 49 is directed around a spindle 123 fixed to a shaft 124 journaled in standards 126 supported on said bars 119.

Shaft 124 is interconnected through a friction clutch 127 to a pulley 128. Continuous counterclockwise rotation (as viewed in Fig. 6) is imparted to pulley 128 through the instrumentality of a belt 129 connected to a pulley 131 fixed to the main operating shaft 132 of the page printing apparatus shown in Patent No. 1,904,164. Shaft 132 carries a gear 133 which meshes with a pinion gear 134 fixed to shaft 135 of a motor 136 (Fig. 2). Motor 136, therefore, through gears 134 and 133, shaft 132, pulley 131, and belt 129 imparts continuous rotation to pulley 128 which, through the friction clutch 127, imparts a constant torque through shaft 124 to the spindle 123. With this arrangement the page material 49 in maintained in a taut condition between the spindle 123 and the roller 91. Thus, when the ratchet 92 is rotated one step a predetermined amount of the page material 49 is delivered from the supply roller 83, which material is immediately taken up by the spindle 123 to preserve the taut condition of the page material.

As disclosed in the aforementioned Patent No. 1,904,164, the page printer 16 is controlled telegraphically by a selector magnet 137. This is connected in a signal line (not shown) on which are impressed code combinations of signalling impulses. The code signals control, through a selector magnet 137 of a sword and T-type selector (not here shown, but illustrated and described in said patent), a series of selector vanes 138 which, in turn, controls through bell cranks 139 (Fig. 9), a set of curved code bars 141 (Figs. 6 and 9). Code bars 141 and bell cranks 139 are supported on a movable type carriage, indicated generally by the numeral 142, which is provided with rollers 143 and 144 whereby it is adapted to travel on tracks 145 and 146, respectively, positioned between side frames 78 and 79. Cooperating with code bars 141 are a plurality of pull bars 147 having individual springs 148. Pull bars 147 are operatively connected by rack and pinion connections to a corresponding plurality of type bars 149 pivoted on a shaft 151.

Type carriage 142 is also provided with a spacing rack 152 which cooperates with a spacing mechanism (not shown) similar to that illustrated in Patent No. 1,904,164, to control the movement of type carriage 142 to form character spaces, tending in this movement to wind up a carriage return spring mechanism indicated generally in Fig. 8 as 150, the strap 160 of which is secured to stud 170 fastened to type carriage 142. Upon receipt of the carriage return signal, a function lever (similar to lever 107) is selected and the carriage return mechanism actuated in the manner described in the aforementioned Patent No. 1,904,164. Carriage return mechanism 150 is thereupon permitted, due to the energy stored therein, to return the type carriage 142 to its normal or beginning-of-line position. A pull bar bail 153 is mounted in the type carriage 142 and is provided with a roller 154 carried on the bottom side thereof on a stud 155. Roller 154 operates between a pair of blades 156 and 157 of a main printing bail 158 so that bail 153 can be reciprocated by bail 158 in any character spacing position of the type carriage 142. Fastened to the printing bail 158 is one end of a printing spring 159, the other end of which is connected to a printing blow adjustment means as shown in Patent No. 1,904,164. Bail 158 is mounted on a shaft 161 on which is also carried a printing bail actuator 162 which cooperates with a printing cam 163. Actuator 162 carries at the end of its upper arm a stud 164 which has abutting relation only with printing bail 158 and is not permanently connected thereto, which is to permit spring printing. Printing bail 158 is also provided with a pair of arms 166 which carry a function lever bail 169. Also carried on shaft 161 is a function bail comprising arms 165, 166, and 167. Arm 165 is provided with a follower roller which cooperates with a function bail cam 168, and arm 167 supports on its end the function bail blade 108.

Associated with the selector vanes 138 are a plurality of function levers 107 mounted on pivot rod 171 and provided with individual springs 172 which tend to rotate the function levers clockwise into registry with the selector vanes 138. The function levers 107 are normally held out of engagement with the selector vanes 138 by means of the rod 169 of the function lever bail. As previously mentioned, the platen frame 82 is pivotally supported on pivots 81 in side frames 78 and 79. The platen comprises a circular disc 173 rotatably mounted on a carriage 174 which is slidable on rods 175 and 176 carried by platen frame 82. Platen carriage 174 is connected to the type carriage, as will be presently described, so as to be movable therewith, the effective printing edge of the platen 173 being located coincident with the printing point or zone determined by the path of operation of the type bar 149.

The platen frame 82 is adapted to be rocked from the "letters" or unshift position to the "figures" or shift position in the manner fully set forth in the aforementioned Patent No. 1,904,164. Briefly, the side frame of the platen frame 82 (as shown in Fig. 6) is provided with a lug 177 which operates between two adjustable stops 178 and 179. Adjacent to lug 177 there is pivoted to the side frame of the platen frame 82 on pivot 181, the upper end of a link 182, the lower end of which is pivoted to the horizontal arm of a bell crank lever 183 pivotally mounted at 184. To the lower end of the depending arm of bell crank 183 is pivoted a push bar 185, the free end of which overlies a rearwardly directed arm of the function lever 107. Push bar 185 is also provided with a shoulder 186 which cooperates with the function lever bail blade 108. The platen frame 86 and platen 173 are shown in the letters or unshift position, with the stop lug 177 against the upper stop screw 178. This condition is achieved when the function bail blade 108 has operated upon the shoulder 186 to move the push bar 185 leftwardly to rotate the bell crank 183 clockwise, thus raising the link 182 to cause the platen frame 82 to rock clockwise.

A correspondingly similar construction is provided for the figures or shift mechanism. That is, a shift function lever 180, similar to lever 107, is provided which when selected is caused to rotate clockwise to bring its rearwardly extending arm into operation to raise a push bar, similar to bar 185, into the path of the function bail blade 108 which, when it is permitted to operate leftwardly (as viewed in Fig. 6), will cause a bell crank, similar to bell crank 183, to pull down a link similar to 182 to rock the platen frame 82 counterclockwise to bring its stop 177 against the lower stop screw 179. The platen frame 82 is maintained in its shift or unshift position by a spring actuated detent member 187 acting on a detent roller 188.

In Figs. 11, 12, and 13 is illustrated the manner in which the platen carriage 174 is connected to the type carriage 142 so as to be movable therewith. As previously mentioned, the platen carriage 174 is slidably supported on rods 175 and 176. Carriage 174 is provided with an eccentric stud engaged by the forked end of a bar 189, the left end of which (as viewed in Fig. 12) is secured to a member 191 which is secured by screws 192 to the type carriage 142. As viewed in Fig. 13, the circular platen 173 is rotatably mounted on the platen carriage 174 by means of an eccentric means 193. By means of the adjustment 193 the platen 173 is adjustable toward and away from the record material to vary the clearance therebetween. Rightward and leftward adjustment, as viewed in Figs. 12 and 13, is also provided for the platen 173, through the instrumentality of the eccentric adjusting means 190.

An important feature of the present invention is the provision of a platen so positioned as to reduce to a minimum the obstruction of the projected image by the platen. To achieve this result the platen 173 is tilted with respect to the record material printed upon, sufficiently to clear the light cone. The peripheral surface of the platen 173, upon which printing is effected, is slightly beveled so that in one of the shift positions of the platen the peripheral surface of the platen will be parallel to the record material. In the present embodiment the peripheral surface of the platen 173 is parallel to the record strip when the platen frame 82 has been shifted to the upper case position, as indicated in Fig. 11, by the dotted line 194 of the platen 173.

To compensate for this arrangement of the platen 173, the type faces on the type bar 149 are arranged as shown in Fig. 5. Moreover, this arrangement of type faces in cooperation with a shield 195 (Fig. 11) serves (as will presently appear) to prevent smudging during the printing operation. As is well known, the type bar 149 is provided with an upper case type face 196 and a lower case type face 197. However, according to the present invention the lower case type face 197 is provided with a slope corresponding to the slope of the periphery of the platen 173 when in the lower case position. The dimension 207 of the upper case type 196 is arranged to be slightly less than the minimum height 210 of the lower case type 197. When printing is effected in the lower case position, the type face 196 being lower than the type face 197, will not touch the record material and hence no smudging of the printed record will occur.

When printing is effected in the upper case position, means is provided for preventing the lower case type face 197 from coming into direct contact with the surface of the record material. To achieve this result a shield 195 is provided which is adapted to be interposed between the type face 197 and the platen 173 when printing is being effected in the upper case position. Shield 195 is secured to the ribbon oscillating member 199, which as described in the aforementioned Patent No. 1,904,164, oscillates the inking ribbon into and out of the path of the type faces during the printing operation. The ribbon oscillator 199 is pivotally articulated to arm 201 of a lever 202 which, in turn, is pivoted at 203 to a lever 204 pivoted at 220 to the type carriage 142. Lever 204 is arranged to carry a roller 205 which rides on the bottom side of a rail 206 mounted on the platen frame 82, as disclosed in the aforementioned Patent No. 1,904,164. Roller 205 is pressed against the rail 206 by a spring (not shown), so that when the platen frame 82 is rocked between the shift and unshift positions, roller 205 will constantly contact with said rail 205, and lever 202 will be reciprocated therewith.

The depending arm 208 of the lever 202 is operably associated with the pull bar bail 153 (Fig. 2) so that the reciprocative motion of bail 153 will cause the oscillation of the lever 202 about pivot 203, whether the platen frame 82 is in the shift or the unshift position. Thus, when the bail 153 is in its normal position (the leftward position as shown in Fig. 6), the lever 202 will hold the inking ribbon, through the instrumentality of the ribbon guide (not shown) located at the upper extremity of member 199 (Fig. 11), in its downward position to effect visibility of the printed character. When the bail 153 moves rightwardly for a printing operation, the ribbon will be raised to printing position due to the counterclockwise movement imparted to the lever 202 by the bail 153. When the platen frame 82 is in the position shown in Fig. 9, which is the lower case printing position, the shield 195, upon oscillation of lever 202, will not be raised sufficiently to be interposed between the type face 197 and the platen 173. However, when the platen frame 82 is in the upper case printing position with the platen 173 in printing relation with the upper case type face 196, the shield 195 will, upon reciprocation, be raised so as to become interposed between the lower case type face 197 and the record material, thus preventing any ink which has accumulated on the type face 197 from smudging the record material.

As illustrated in Figs. 11, 12, and 13, there is provided a platen rotator for automatically changing the printing point of the platen 173 in response to each carriage return operation. As previously described, the platen 173 spaces with the type carriage 142, and accordingly is spaced step-by-step for character spacing and, upon reaching the end of the line, the platen 173 is returned rapidly with the carriage 142 to the beginning-of-line position. In contact with the platen 173 at a point opposite to the printing point is a closely wound coiled spring 200 which is connected at its ends to the side frame members of the platen supporting frame 82, in such a manner that the platen 173 is caused to rotate as it advances during character spacing. Moreover, upon the rapid return movement of the platen 173 (under the influence of the carriage return spring 150) during the performance of the carriage return function, the platen 173 will, owing to the combined sliding and rolling relation with the yieldable spring member 200, rotate incommensurately, thus causing the same printing point of the platen to be presented to the type bars a minimum number of times. In other words, through the instrumentality of the platen rotator 200, the platen 173 is controlled in such manner as to reduce to a minimum the number of times any particular printing point on the platen is impinged upon, thereby reducing to a minimum the wear at any given point and hence prolonging the life of the platen. In lieu of the coiled spring 200, a taut wire or cord, of course, can be used.

In accordance with the present invention, the printing apparatus used in combination with the projection system is of such structure and arrangement that it is not affected by change in physical position of the assembly as a whole with respect to gravity. Specifically, a counterweight is provided which is associated with the movable type carriage 142 so as to render the movement of the type carriage 142 independent of the force of gravity and to assist the carriage return spring in uniformly moving the type carriage in any physical position of the printer.

As previously described, the type carriage 142 is movably supported on tracks 145 and 146, and after being operated upon by the spacing mechanism, the carriage 142 is returnable to the beginning-of-line position by the carriage return spring mechanism 150. Having reference to Fig. 8, the type carriage 142 has secured thereto a bar 209 to the center of which is secured a stud 211 on which is pivoted a bar 212. A strap 213 is secured to end 214 of bar 212, and extends around an idler roller 215 and is secured at 216 to a counterweight 217. Roller 215 is rotatably supported on a bar 218 suitably positioned in the frame 15. Secured to end 219 of bar 212 is a strap 221 which extends around an idler roller 222 and is fastened at 223 to the counterweight 217. Idler roller 222 is rotatably mounted on the bar 218. Counterweight 217 is provided with rollers 224 and 225 which roll on upper rail 226, and rollers 227 and 228 which roll on lower rail 229. Rails 226 and 229 are appropriately supported in the frame 15. Secured at 231 to the counterweight 217 is a strap 232 of a spring return mechanism 233 comparable to the carriage return spring mechanism 150. The spring return mechanism 233 is mounted on a bracket 234 secured to the frame 15.

As the carriage 142 advances step by step in response to the spacing mechanism, the carriage return spring mechanism 150 is wound up and energy is stored therein in readiness to return the carriage. At the same time, the carriage return mechanism 233 is also wound up to store energy therein, so that when the carriage return signal is received by the printer the carriage is freed in the manner described in the aforementioned Patent No. 1,904,164, and the carriage return operation is effected through the release of the energy stored up in the return mechanisms 150 and 233. In the embodiment shown in Fig. 8, the return of the carriage 142 and the counterweight 217 is illustrated as effected by two return mechanisms, the return mechanism 150 acting directly upon the type carriage 142 and the return mechanism 233 acting directly upon the counterweight 217. The two return mechanisms cooperate to facilitate the return of both devices. If desired, a single return mechanism may be employed by providing a return spring mechanism of sufficient strength to return both devices. In this event, the spring return mechanism may be located either at the position shown by the return mechanism 150 or by the return mechanism 233. The carriage return mechanism 150 is provided with a dashpot buffer mechanism as is shown and described in the aforementioned Patent No. 1,904,164.

The counterweight return mechanism is similarly provided with a buffer mechanism. This buffer mechanism for the counterweight 217 comprises a dashpot 235 suitably mounted in the plate 236 secured to frame 15. Pivotally supported at 237 on bracket 240 and properly positioned with respect to buffer 235 is a buffer lever 238. The rounded end of lever 238 fits into a notched portion of the plunger 239 of the buffer 235. End 241 of the plunger 239 is adapted to receive the blow from the counterweight 217, said end 241 being receivable in the counterbore 242 in the counterweight 237. The counterbore 242 is indicated in the present embodiment for structural purposes only and is not an essential element of the structure. The resistance of pneumatic buffer 235 is varied by means of adjustable ports, in a well-known manner. A spring 243 tends to rotate lever 238 in a counterclockwise direction (Fig. 8) about pivot 237 to restore the buffer mechanism to its operative position.

Normally, in making a printed record the impact of the type faces against the platen in the lower case position is slightly greater than it is in the upper case position of type faces 196, due to the fact that the lower case type faces 197 are closer to the type bar pivot 151 than are the upper case type faces 196. In an ordinary printed record the slight difference in density of printing in each case is not discernible. However, due to the characteristics of the transparent web upon which printing is effected for projection, this difference of density of printing is more noticeable. To compensate for this variation in density of printing, the present invention provides means for equalizing the printing impact of the lower and upper case type faces automatically, so that printing of equal density is produced upon the record material. The variation in density of printing is more noticeable when printing is effected upon transparent record material, such as is used in printer-projector apparatus of the type according to the present invention.

Figure 7:
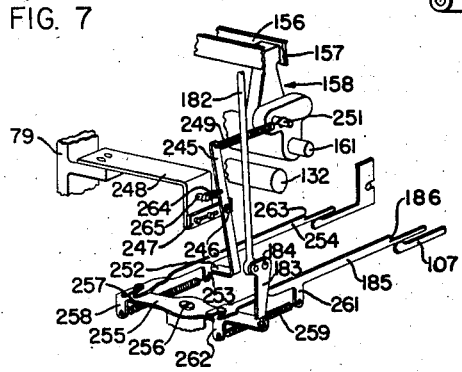
Fig. 7 is a perspective view of the printer impact equalizing mechanism according to the present invention.

Having reference to Figs. 3 and 7, a lever 245 is pivoted at 246 to a plate 247 which is adjustably mounted by means of slot-and-screw adjusting means to bracket 248 carried by printer frame 79. A spring 249 extends between the upper end of lever 245 and a spring post 251 carried on printing bail 158. The lower end of lever 245 is provided with a laterally extending portion 252 which cooperates with a depending projection 253 on the upper case shift push bar 254. Lower case and upper case push bars 185 and 254, respectively, are articulated to a platen shift control lever 255 pivoted at 256 in the printer in such manner that lever 255 is rotated in a counterclockwise direction (as viewed in Fig. 7) when push bar 254 is operated leftwardly by the function bail blade 108, and in a clockwise direction when push bar 185 is operated leftwardly. Push bar 254 is maintained in operative relation with control lever 255 by a spring 257 extending from projection 253 on bar 254 to a projection 258 on lever 255. Similarly, push rod 185 is maintained in operative relation with control lever 255 by a spring 259 extending from projection 261 on bar 185 to projection 262 on lever 255.

To print a character, the code signal corresponding thereto is received by the selector magnet 137 (Fig. 6) which, in turn, controls, through selector vanes 138 and bell crank levers 139, the setting of code bars 141. The selector cam drum associated with selector magnet 137 controls (as described in Patent No. 1,904,164) the initiation of rotation of operating shaft 132 which carries the printing cam 163 and the function cam 168. In proper timed relation with the setting of code bars 141, the printing bail 158 is operated under control of cam 163 to cause the reciprocation, through the instrumentality of roller 154, of pull bar bail 153, which, through the rack and pinion articulation between pull bars 147 and type bars 149 will cause the impingement of the selected type bar against the platen 173 to effect printing.

The power for effecting the printing operation is supplied by the printing spring 159 and, as previously mentioned, a means is provided for automatically varying the power supplied by said spring in accordance with the case shift condition of the printer. It has been found upon magnification of the printed record incident to projection upon a screen, that the difference in the distances of the upper and lower type faces from the type bar pivot causes a difference in the weight of printing which indicates a difference in the printing impact of said type faces. To equalize the printing impact so that it is substantially the same in both upper and lower case, the spring 249 is provided, which in the lower case position is caused to resist the movement of the printing spring 159, thereby reducing the impact of the lower case type face against the platen sufficiently to equal the corresponding impact of the upper case type face.

Upon receipt of the lower case or "letters" shift signal, the "letters" shift function lever 107 is selected and operated in the manner described in Patent No. 1,904,164 to raise push bar 185 to bring shoulder 186 thereon into the path of function lever bail blade 108 which, when operated, urges push bar 185 leftwardly (as viewed in Fig. 7) to impart clockwise rotation to control lever 255. Lever 255, besides effecting the shift of the platen frame 82 to the "letters" case position (as indicated in Figs. 3 and 6), causes the push bar 254 to be moved rightwardly, and in so doing, the projection 253 thereon engages the lateral portion 252 of lever 245, thereby imparting counterclockwise movement to lever 245 to stretch the spring 249, thus increasing the tension therein. Now, when the printing bail 158 is operated in response to subsequent character code signals, the pull of the printing spring 159 will be resisted by the pull of spring 249, thereby reducing the force of the printing blow, so that the impact of printing is equal in both upper and lower case.

When the upper case or "figures" shift signal is received, the "figures" shift function lever 180 is selected and operated to bring shoulder 263 of push bar 254 into the path of function lever bail blade 108, which, when operated, urges push bar 254 leftwardly to impart counterclockwise rotation to lever 255, which movement will cause, through bell crank lever 183 and link 182, the platen frame 82 to be shifted to the upper case position with projection 177 bearing against stop 179. Moreover, push bar 185 will be shifted rightwardly, and projection 253 of bar 254 will be moved away from and out of operative engagement with lateral portion 252 of lever 245. Spring 249 will thereupon be rendered ineffective, since lever 245 and spring 249 are now free to move with printing bail 158, and no resistance is offered by spring 249 to the printing spring 159. A spring 264 of very light tension extending from lever 245 to spring post 265 on bracket 248 is provided to take up the play of the mechanism.

Although specific embodiments of the invention have been shown herein, it will be understood that the invention is capable of modification, and it is intended that all forms which come within the range of equivalency are to be embraced within the scope of the appended claims.

What is claimed is:

1. In a printing device, a carriage movable to form character spaces, means for advancing said carriage, means for returning said carriage, and gravity responsive means cooperatively associated with said second recited means to render said second recited means effective irrespective of change in physical position of the printing device with respect to gravity.

2. In a printing device, a type carriage movable to form character spaces, automatic means for moving said carriage to effect character spacing, means for returning said carriage, and gravity responsive means cooperatively associated with said second recited means to render said second recited means effective irrespective of change in physical position of the printing device with respect to gravity.

3. In a printing device, a movable carriage, automatic means for moving said carriage in one direction, means for moving said carriage in the opposite direction, and gravity responsive means cooperatively associated with said second recited means to render said second recited means effective irrespective of change in physical position of the printing device with respect to gravity.

4. In a recorder, a stationary supporting framework, a type carriage movable with respect to said stationary framework, a printing bail in said stationary framework, slidable connecting means between said carriage and said bail to effect recording operations, spacing mechanism effective automatically for advancing said carriage an incremental amount during each recording operation, a carriage return mechanism for restoring said carriage automatically to beginning-of-line position, and gravity responsive means cooperatively associated with said spacing and carriage return mechanisms to render said mechanisms effective irrespective of change in physical position of the recorder with respect to gravity.

5. In a printing device, a carriage, track means for facilitating the movement of said carriage to form character spaces, means effective automatically for moving said carriage in one direction, energy storing and releasing means for moving said carriage in the opposite direction, a gravity responsive means, a second track means for facilitating the operation of said gravity responsive means with respect to said carriage, and interconnecting instrumentalities between said carriage and said gravity responsive means, whereby said gravity responsive means is effective to render both said carriage moving means effective irrespective of change in physical position of the printing device with respect to gravity.

6. In a printing device, a carriage, supporting means therefor, means effective automatically under certain operating conditions for moving said carriage along said supporting means in one direction, power storage means effective under other operating conditions for moving said carriage in the opposite direction, gravity responsive means, means for facilitating the operation of said gravity responsive means with respect to said carriage, and interconnecting instrumentalities between said carriage and said gravity responsive means, whereby said gravity responsive means is effective to render both of said carriage moving means effective irrespective of change in physical position of the printing device with respect to gravity.

7. In a printing device, a type carriage, track means for facilitating the movement of said carriage to form character spaces, means effective automatically for moving said carriage in one direction, power storage means for moving said carriage in the opposite direction, a gravity responsive means, a second track means for facilitating the operation of said gravity responsive means with respect to said carriage, and interconnecting instrumentalities between said carriage and said gravity responsive means, whereby said gravity responsive means is effective to render both of said carriage moving means effective irrespective of change in physical position of the printing device with respect to gravity.

8. In a recorder, a stationary part comprising a supporting framework, a type carriage movable with respect to said framework, a printing bail in said stationary part, slidable connecting means between said carriage and said bail to effect recording operations, spacing mechanism effective automatically for advancing said carriage an incremental amount during each recording operation, a carriage return mechanism for automatically restoring said carriage to beginning-of-line position, gravity responsive means, means for facilitating the operation of said gravity responsive means with respect to said carriage, and interconnecting instrumentalities between said carriage and said gravity responsive means, whereby said gravity responsive means is effective to render said spacing and carriage return mechanism effective irrespective of change in physical position of the recorder with respect to gravity.

9. In a recorder, a stationary part comprising a supporting framework, a type carriage movable with respect to said framework, a printing bail in said stationary part, slidable connecting means between said carriage and said bail to effect recording operations, spacing mechanism effective automatically for advancing said carriage an incremental amount during each recording operation, power storage means for returning said carriage, and gravity responsive means cooperatively associated with said power storage means to render said power storage means effective irrespective of change in physical position of the recorder with respect to gravity.

10. In a printing device, a movable carriage, automatic means for moving said carriage in one direction, energy storing and releasing means for moving said carriage in the opposite direction, and gravity responsive means cooperatively associated with said energy storing and releasing means to render said energy storing and releasing means effective irrespective of change in physical position of the printing device with respect to gravity.

11. In a printing device, a movable carriage, spacing mechanism effective automatically for moving said carriage in one direction, carriage return mechanism for automatically moving said carriage in the opposite direction, and gravity responsive means to render both said mechanisms invariably effective in a predetermined manner on said carriage irrespective of change in physical position of said device with respect to gravity.

WILLIAM H. EDDY.